US012705727B2

(12) United States Patent
Ando et al.

(10) Patent No.: US 12,705,727 B2
(45) Date of Patent: Aug. 11, 2026

(54) WORKPIECE PROCESSING APPARATUS AND METHOD FOR PROCESSING WORKPIECE

(71) Applicant: SINTOKOGIO, LTD., Nagoya (JP)

(72) Inventors: Yoshinobu Ando, Nagoya (JP); Yusuke Yamada, Nagoya (JP); Shuichi Kamori, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 608 days.

(21) Appl. No.: 18/121,616

(22) Filed: Mar. 15, 2023

(65) Prior Publication Data

US 2023/0306585 A1 Sep. 28, 2023

(30) Foreign Application Priority Data

Mar. 28, 2022 (JP) ................................ 2022-051441

(51) Int. Cl.
*G06T 7/00* (2017.01)

(52) U.S. Cl.
CPC .... *G06T 7/001* (2013.01); *G06T 2207/30164* (2013.01)

(58) Field of Classification Search
CPC .. G06T 7/001; G06T 2207/30164; F42D 3/00
See application file for complete search history.

(56) References Cited

U.S. PATENT DOCUMENTS 6,059,639 A 5/2000 Kuehn et al.
10,086,487 B2 * 10/2018 Itou .................... B23Q 11/0046
2016/0184947 A1 * 6/2016 Itou .................... B23Q 11/0046 15/319
2022/0051019 A1 2/2022 Okamura
2022/0289484 A1 * 9/2022 Oberpriller ............ B65G 13/02

FOREIGN PATENT DOCUMENTS

DE 102016002658 A1 * 9/2016
JP 2011-110642 A 6/2011
JP 2017064817 A * 4/2017
JP 2018-158411 A 10/2018
JP 2022-032505 A 2/2022
WO WO 0030160 * 5/2000

OTHER PUBLICATIONS

Japanese Office Action issued Jul. 1, 2025, in Application No. 2022-051441.

* cited by examiner

*Primary Examiner* — Samir A Ahmed
(74) *Attorney, Agent, or Firm* — Faegre Drinker Biddle & Reath LLP

(57) ABSTRACT

A workpiece processing apparatus includes: a cabinet having a projection chamber, workpieces being subjected to processing in the projection chamber; a projector configured to project projection media toward the workpieces charged into the projection chamber; an image sensor configured to image the projection chamber to form an image; and a control unit configured to output information relating to presence or absence of a residue in the projection chamber based on an initial image and an inspection image, the initial image being an image formed by the image sensor and being an image of the projection chamber with no workpiece remaining, the inspection image being an image formed by the image sensor and being an image of the projection chamber after discharging processing in which the plurality of workpieces are discharged from the projection chamber.

11 Claims, 2 Drawing Sheets

START
WORKPIECE PREPARATION PROCESSING
S10
CABINET OPENING PROCESSING
S12
WORKPIECE CHARGING PROCESSING
S14
CABINET CLOSING PROCESSING
S16
BLASTING PROCESSING
S18
PROJECTION MEDIA DISCHARGING PROCESSING
S20
WORKPIECE DISCHARGING PROCESSING
S22
IMAGING PROCESSING
S24
S26
RESIDUE BEING NOT PRESENT?
NO
YES
S28
STOP PROCESSING
END

WORKPIECE PROCESSING APPARATUS AND METHOD FOR PROCESSING WORKPIECE

TECHNICAL FIELD

The present disclosure relates to a workpiece processing apparatus and a method for processing a workpiece.

CROSS-REFERENCE TO RELATED APPLICATION

This application claims the benefit of priority from Japanese Patent Application No. 2022-051441, filed on Mar. 28, 2022, the entire contents of which are incorporated herein by reference.

BACKGROUND

Japanese Unexamined Patent Publication No. 2011-110642 discloses grinding and cleaning equipment that grinds and cleans a plurality of workpieces by blasting. The grinding and cleaning equipment includes a rotary drum which accommodates the plurality of workpieces, and an abrasive grain projection device. The rotary drum agitates the plurality of workpieces. During agitation of the plurality of workpieces, the abrasive grain projection device projects abrasive grains toward the plurality of workpieces to grind and clean the plurality of workpieces. After grinding and cleaning ends, the rotary drum tilts downward to discharge the plurality of ground and cleaned workpieces.

SUMMARY

In the grinding and cleaning equipment described in Japanese Unexamined Patent Publication No. 2011-110642, the rotary drum itself tilts and hence, the grinding and cleaning equipment has a function of being capable of discharging all of the plurality of workpieces. However, this grinding and cleaning equipment cannot confirm the complete discharge of all workpieces. The present disclosure provides a technique that can confirm the discharge of workpieces to which treatment has been applied.

A workpiece processing apparatus according to the present disclosure includes a cabinet, a projector, an image sensor, and a control unit. The cabinet has a projection chamber, a plurality of workpieces being subjected to processing in the projection chamber. The projector projects projection media toward the plurality of workpieces charged into the projection chamber. The image sensor picks up an image of the projection chamber to form an image. The control unit outputs information relating to presence or absence of a residue in the projection chamber based on an initial image and an inspection image, the initial image being an image formed by the image sensor and being an image of the projection chamber with no workpiece remaining, the inspection image being an image formed by the image sensor and being an image of the projection chamber after discharging processing in which the plurality of workpieces are discharged from the projection chamber.

According to this workpiece processing apparatus, the image of the projection chamber is picked up to form an image. Based on the initial image, which is the image of the projection chamber with no workpieces remaining, and the inspection image, which is the image of the projection chamber after the discharging processing, information relating to the presence or absence of a residue in the projection chamber is outputted. As described above, the workpiece processing apparatus can output information relating to the presence or absence of a residue in the projection chamber based on the image of the projection chamber and hence, the discharge of the workpieces to which treatment has been applied can be confirmed.

In one embodiment, the initial image may be an image obtained such that an image of the projection chamber is picked up by the image sensor at the time of starting up the workpiece processing apparatus for the first time or at the time of maintenance. In this case, the workpiece processing apparatus can output information relating to the presence or absence of a residue in the projection chamber by using the state of the projection chamber at the time of starting up the workpiece processing apparatus for the first time or at the time of maintenance as a criterion.

In one embodiment, the control unit may compare the initial image and the inspection image and may output the information relating to presence or absence of a residue in the projection chamber. In this case, the workpiece processing apparatus can output information relating to the presence or absence of a residue in the projection chamber based on the comparison result.

In one embodiment, the control unit may output the information relating to the presence or absence of a residue in the projection chamber based on difference information between the initial image and the inspection image. In this case, the workpiece processing apparatus can output the information relating to the presence or absence of a residue in the projection chamber based on the difference information.

In one embodiment, the control unit may store at least either one of operation information of the workpiece processing apparatus and processing information of the plurality of workpieces in a storage device in association with the inspection image. In this case, the workpiece processing apparatus can refer to at least either one of the operation information of the workpiece processing apparatus or the processing information of the plurality of workpieces from the inspection image and hence, the workpiece processing apparatus can utilize the inspection image as product quality management information.

A method for processing a workpiece according to another aspect of the present disclosure includes the following steps.

(1) A step of forming an initial image by imaging an image of a projection chamber with no workpiece remaining.

(2) A step of projecting projection media toward a plurality of workpieces in the projection chamber.

(3) A step of discharging, from the projection chamber, the plurality of workpieces to which the projection media are projected.

(4) A step of forming an inspection image by imaging an image of the projection chamber after the step of discharging the plurality of workpieces.

(5) A step of outputting information relating to presence or absence of a residue in the projection chamber based on the initial image and the inspection image.

According to this method for processing a workpiece, advantageous effects substantially equal to the advantageous effects of the above-described workpiece processing apparatus can be obtained.

According to the present disclosure, a technique that can confirm the discharge of workpieces to which treatment has been applied can be provided.

DETAILED DESCRIPTION

Hereinafter, an embodiment of the present invention will be described with reference to drawings. In respective drawings, identical or corresponding components are given the same reference symbols.

(Configuration of Workpiece Processing Apparatus)

Figure 1:
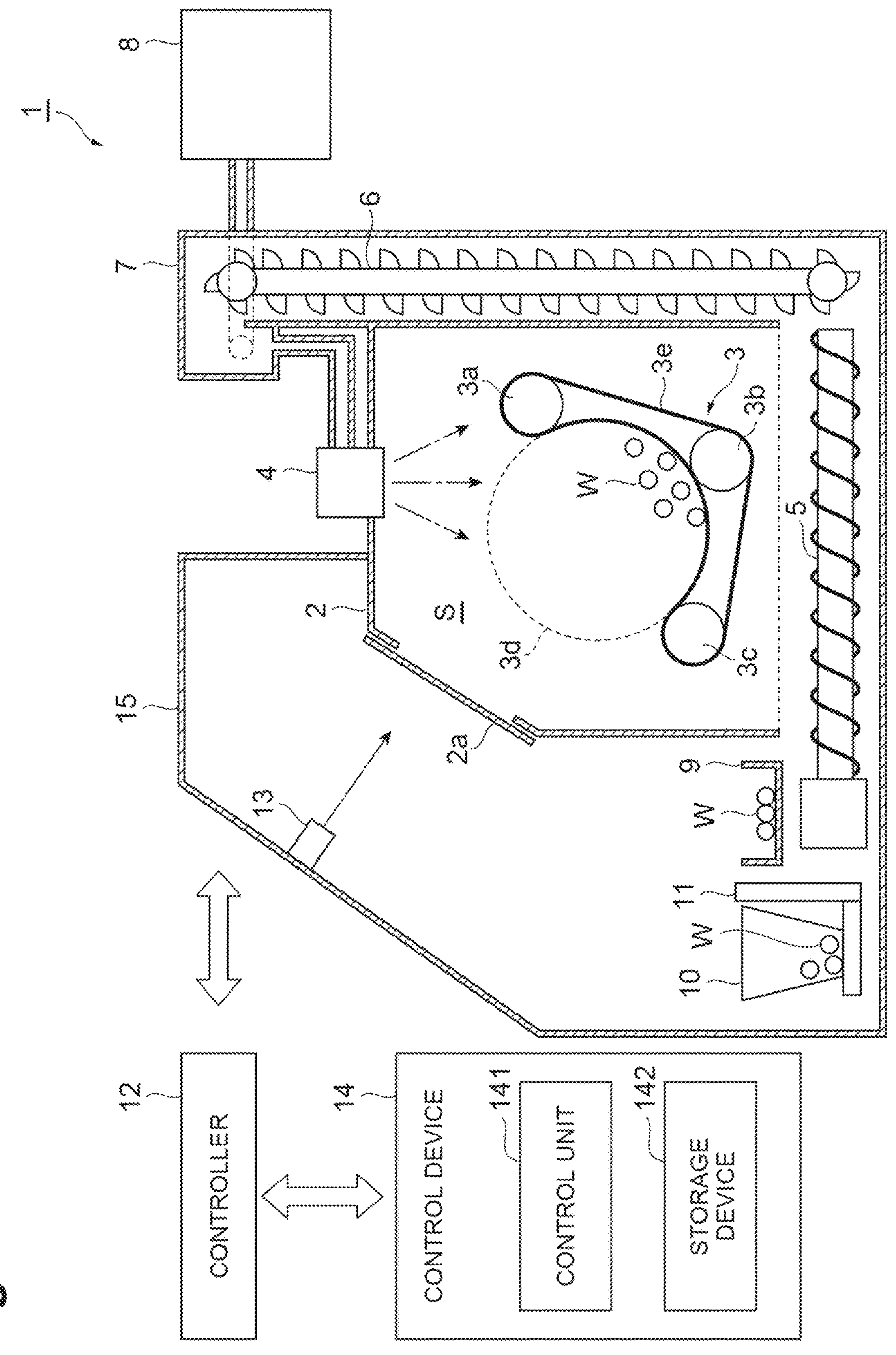
FIG. 1 is a schematic diagram of a workpiece processing apparatus according to one embodiment.

FIG. 1 is a schematic diagram of a workpiece processing apparatus according to one embodiment. A workpiece processing apparatus 1 shown in FIG. 1 is an apparatus that applies blasting to a plurality of workpieces W. Although the plurality of workpieces W are not particularly limited, an example of the plurality of workpieces W includes a plurality of metal products. Hereinafter, a so-called apron type blasting machine will be described as one example of the workpiece processing apparatus.

As shown in FIG. 1, the workpiece processing apparatus 1 include a cabinet 2. The cabinet 2 has a projection chamber S, the plurality of workpieces W being subjected to processing in the projection chamber S. An apron 3 that causes the workpieces W to be agitated is disposed in the projection chamber S. The apron 3 includes a drive roller 3*a*, two driven rollers 3*b*, 3*c*, a pair of headliners 3*d*, and an apron belt 3*e* (agitation belt).

The drive roller 3*a* includes a roller body having a substantially columnar shape, and the shaft of the roller body is rotatably and pivotally supported on both side walls of the cabinet 2 in such a way as to extend along the width direction of the cabinet 2. The drive roller 3*a* is configured to be rotatable about the shaft of the roller body by a motor not shown in the drawing. The driven roller 3*b* is disposed below the drive roller 3*a*, and the driven roller 3*c* is disposed at substantially the same height position as the driven roller 3*b*. Each of the driven rollers 3*b*, 3*c* includes a roller body having a substantially columnar shape, and the shaft of each roller body is rotatably and pivotally supported on both side walls of the cabinet 2 in such a way as to be parallel to the shaft of the drive roller 3*a*. Each of the pair of headliners 3*d* is a member having a substantially disk shape, and the outer diameter of each of the pair of headliners 3*d* has a length substantially equal to the distance between the drive roller 3*a* and the driven roller 3*b*. The pair of headliners 3*d* are rotatably and pivotally supported by the side walls of the cabinet 2.

The apron belt 3*e* is an endless belt. The apron belt 3*e* is wound around the drive roller 3*a* and the pair of driven rollers 3*b*, 3*c*. The outer peripheral portions of the headliners 3*d* are brought into contact with both side edges of the apron belt 3*e*. To avoid stagnation of projection media on the apron belt 3*e*, a plurality of through holes are formed in the apron belt 3*e*. The apron belt 3*e* is configured to move on an endless track having a substantially L shape. During shot processing, the plurality of workpieces W are disposed on the apron belt 3*e* and the apron belt 3*e* is rotated in the forward rotation direction, so that the workpieces are agitated on the apron belt 3*e*. When the apron belt 3*e* is rotated in the reverse rotation direction, the plurality of workpieces W are carried out from the cabinet 2.

A projector 4 is provided at the upper portion of the cabinet 2. The projector 4 projects projection media toward the plurality of workpieces W charged into the projection chamber S. The projector 4 may be a centrifugal projection unit, for example. When impellers rotate, projection media, such as steel balls, are projected toward the plurality of workpieces W in the projection chamber S, so that blasting is applied to the plurality of workpieces W under agitation. The projection media projected into the projection chamber S by the projector 4 fall beneath the projection chamber S. The fallen projection media are conveyed to a bucket elevator 6, which are provided next to the cabinet 2, by a screw conveyor 5 extending in the horizontal direction. The bucket elevator 6 conveys the projection media in the vertical direction. The conveyed projection media are supplied to a separator 7 provided at the upper portion of the cabinet 2. The separator 7 separates the projection media and impurities from each other by wind power classification. The impurities are suctioned by a dust collector 8. The projection media are supplied to the projector 4. The projection media are circulated and used as described above.

A door (not shown in the drawing) is provided in the cabinet 2, and is openable to carry out the plurality of workpieces W that are carried out from the apron 3. When the apron belt 3*e* is rotated in the reverse rotation direction, the plurality of workpieces W are placed on a carry-out conveyor 9 via the above-described door. The carry-out conveyor 9 conveys the plurality of workpieces W, to which treatment has been applied, to an area in which a post process is performed.

To charge the workpieces W into the projection chamber S, the workpiece processing apparatus 1 includes a bucket 10 and a bucket loader 11. The bucket loader 11 is configured to be able to be elevated and lowered by a motor or the like, and conveys the plurality of workpieces W to which treatment has not yet been applied to the position of an openable lid 2*a* of the cabinet 2. The workpieces W to which treatment has not yet been applied are charged into the projection chamber S by the bucket loader 11 in this manner.

The respective elements of the above-described workpiece processing apparatus 1 are controlled by a controller 12. The controller 12 may be a PLC (Programmable Logic Controller), for example. The controller 12 may also be a computer system which includes a processor, such as a CPU (Central Processing Unit), memories, such as a RAM (Random Access Memory) and a ROM (Read Only Memory), input/output devices, such as a touch panel, a mouse, a keyboard, and a display, and a communication device, such as a network card, for example. The controller 12 achieves the function of the controller 12 by operating respective hardware under the control of the processor based on a computer program stored in the memory.

To confirm a fact that all of the plurality of workpieces W are carried out from the projection chamber S, the workpiece processing apparatus 1 includes a camera 13 (one example of an image sensor) and a control device 14. The camera 13 is an image sensor that picks up an image of the projection chamber S to form an image. The camera 13 is supported by a frame 15, which is provided next to the cabinet 2, such that the projection chamber S is within the angle of view. The camera 13 picks up an image of the projection chamber S at a timing at which the lid 2*a* of the cabinet 2 is opened, for example.

In the same manner as the above-described controller 12, the control device 14 may also be a PLC, or may also be a computer system. The control device 14, functionally, includes a control unit 141 and a storage device 142. The control unit 141 is configured to be capable of communication with the camera 13. The control unit 141 is configured to be able to control the imaging timing of the camera 13 and to be able to change imaging parameters of the camera 13. For example, the control unit 141 may change the camera parameters according to the product being an imaging target. Such a configuration can improve accuracy of information relating to the presence or absence of a residue in the projection chamber S, which will be described later.

The storage device 142 stores in advance an image (initial image) used as a criterion based on which it is judged that workpieces are not remaining. The initial image is an image formed by the camera 13, and is an image of the projection chamber S with no workpieces W remaining. For example, the initial image is obtained such that the image of the projection chamber S is picked up by the camera 13 at the time of starting up the workpiece processing apparatus 1 for the first time or at the time of maintenance.

The control unit 141 obtains an image (inspection image) from the camera 13. The inspection image is an image formed by the camera 13, and is an image of the projection chamber S after discharging processing, in which the plurality of workpieces W are discharged from the projection chamber S. The control unit 141 outputs information relating to the presence or absence of a residue in the projection chamber S based on the initial image obtained by referring to the storage device 142 and the inspection image obtained by the camera 13. The information relating to the presence or absence of a residue is information indicating whether a plurality of workpieces W remain in the projection chamber S. The information may be a letter, an image, video, sound, vibrations or the like, and the form of the information is not particularly limited. An output of the information includes not only a mode where data is brought into a recognizable state, but also a mode where data is outputted and stored in a storage medium.

The control unit 141 may machine learn a plurality of initial images, and may output information relating to the presence or absence of a residue in the projection chamber S based on the learning results and the inspection image obtained by the camera 13. For example, when the control unit 141 determines, based on the learning results, that the inspection image is similar to the initial image, the control unit 141 outputs information indicating that the plurality of workpieces W are not remaining in the projection chamber S.

The control unit 141 may compare the initial image and the inspection image, and may output information relating to the presence or absence of a residue in the projection chamber. The control unit 141 may calculate a coincidence by comparing feature points of both images, for example, and may output, based on the calculated coincidence, information indicating whether a plurality of workpieces W remain in the projection chamber S. For example, when the coincidence is a threshold or more, the control unit 141 outputs information indicating that the plurality of workpieces W are not remaining in the projection chamber S.

The control unit 141 may output information relating to the presence or absence of a residue in the projection chamber S based on difference information between the initial image and the inspection image. For example, the control unit 141 may form a difference image, in which the difference between the pixel values of the initial image and the pixel values of the inspection image is used as pixel values for the difference image, may determine whether a region with pixel values of a predetermined threshold or more corresponds to a product, and then may output information indicating whether a plurality of workpieces W remain in the projection chamber S. For example, when the region with pixel values of the predetermined threshold or more is not present, the control unit 141 outputs information indicating that the plurality of workpieces W are not remaining in the projection chamber S.

As described above, the plurality of small holes are formed in the apron belt 3*e*, and a joint member or the like may be provided to the apron belt 3*e*. Therefore, there is a concern that the external appearance of the apron belt 3*e* may change according to the rotational position of the apron belt 3*e*. The control unit 141 may learn appearance (brightness, color) corresponding to the rotational position of the apron belt 3*e* based on a plurality of initial images. The control unit 141 may correct the inspection image according to the rotational position of the apron belt 3*e*, and may determine whether a plurality of workpieces W are remaining in the projection chamber S by applying at least one of the above-described determination methods to the corrected inspection image.

Based on the initial image and the inspection image, the control unit 141 can also determine abrasion of respective components that define the projection chamber S. An image change in the case where a residue is present in the projection chamber S differs in feature from an image change caused by abrasion. Based on the feature of the changes in pixel values, the control unit 141 determines abrasion of the respective components that define the projection chamber S. With such a configuration, it is possible to monitor abrasion of and promptly specify a replacement time of the respective components that define the projection chamber S and hence, abnormality of equipment that may cause product defects can be prevented.

The control unit 141 may store the image formed by the camera 13 in the storage device 142. The control unit 141 is configured to be capable of communication with the controller 12, and can obtain operation information of the workpiece processing apparatus 1 and processing information of the plurality of workpieces W from the controller 12. Examples of the operation information include an operating time, the current value of the impeller or the conveyor, the rotational speed of the impeller, and the conveyance speed of the conveyor. Examples of the processing information include processing time of the workpieces W, an outside air temperature, and humidity. The control unit 141 stores at least either one of the operation information or the processing information in the storage device 142 in association with the inspection image. With such a configuration, the workpiece processing apparatus 1 can provide a traceability function to the user. Further, the workpiece processing apparatus 1 not only can perform quality management, but also can provide treatment reference data when processing is performed on a similar product.

(Method for Processing Workpiece)

Figure 2:
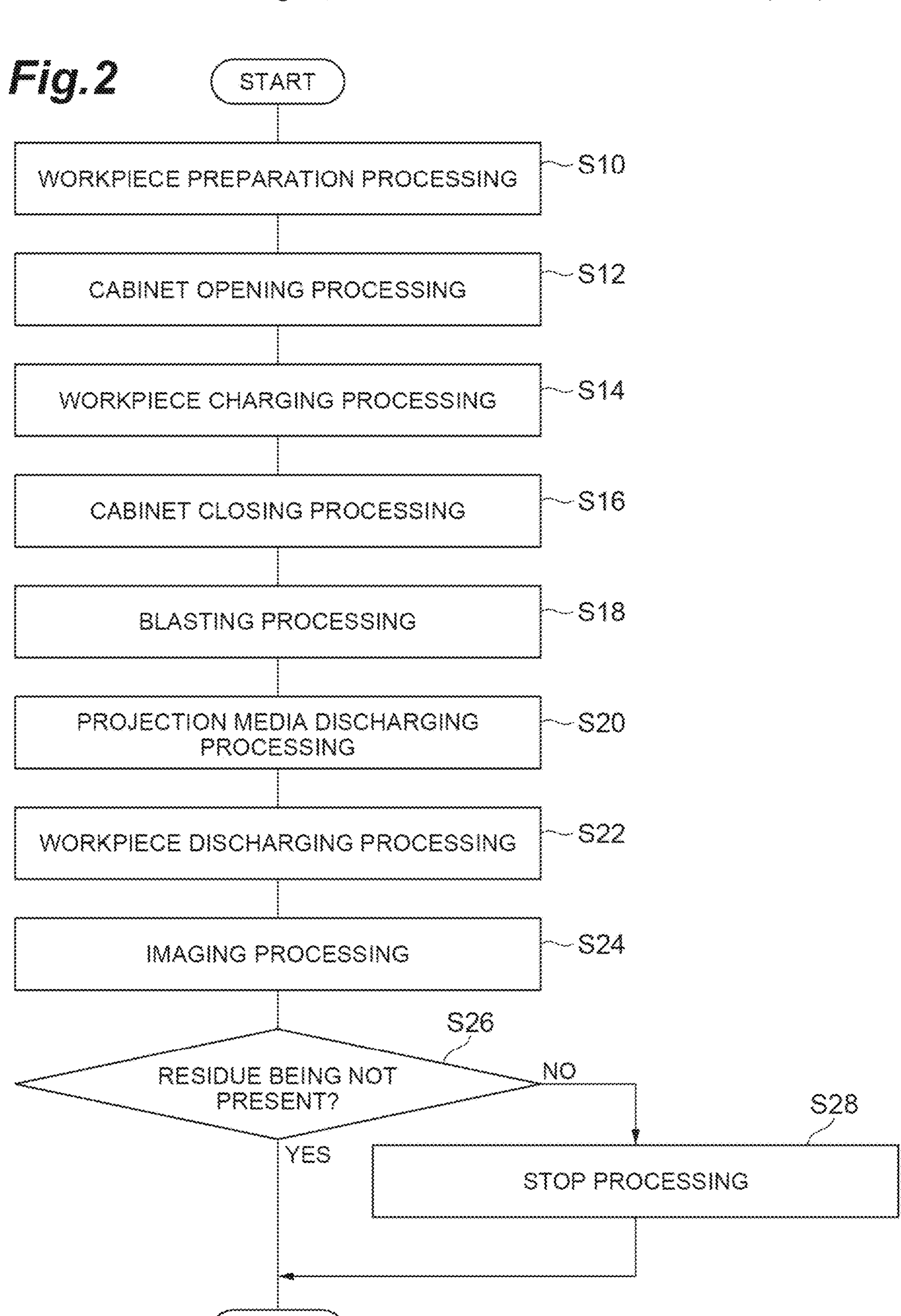
FIG. 2 is a flowchart showing operations of the workpiece processing apparatus according to one embodiment.

FIG. 2 is a flowchart showing operations of the workpiece processing apparatus. A method for processing a workpiece shown in FIG. 2 is performed by the workpiece processing apparatus 1. It is assumed that the workpiece processing apparatus 1 has obtained an initial image before the method for processing a workpiece is performed.

First, as workpiece preparation processing (step S10), an operator or the like charges a plurality of workpieces W into the bucket 10.

Subsequently, as cabinet opening processing (step S12), the controller 12 of the workpiece processing apparatus 1 brings the lid 2*a* of the cabinet 2 into an open state.

Subsequently, as workpiece charging processing (step S14), the controller 12 causes the bucket loader 11 to convey the bucket 10 in order to dispose the bucket 10 at a workpiece charging position. Then, the controller 12 causes the bucket loader 11 to incline the bucket 10 in order to charge the plurality of workpieces W into the projection chamber S.

Subsequently, as cabinet closing processing (step S16), the controller 12 brings the lid 2*a* of the cabinet 2 into a closed state. With such an operation, the projection chamber S of the cabinet 2 is brought into a sealed state.

Subsequently, as blasting processing (step S18), the controller 12 performs blasting, in which projection media are projected toward the plurality of workpieces W. First, the controller 12 causes the apron 3 to be operated (rotated in the forward rotation direction). With such an operation, agitation of the plurality of workpieces W is started. Simultaneous with the start of the agitation, the controller 12 causes the projector 4, the screw conveyor 5, the bucket elevator 6, and the dust collector 8 to be driven, so that the projection media are supplied to the projector 4. The projector 4 projects the projection media toward the plurality of workpieces W under agitation. With such an operation, the plurality of workpieces W are subjected to blasting without bias. Further, the screw conveyor 5, the bucket elevator 6, and the dust collector 8 recover and circulate the projection media.

After blasting processing (step S18) ends, as projection media discharging processing (step S20), the controller 12 stops supply of the projection media to the projector 4 and the operation of the projector 4. Then, the controller 12 causes the apron belt 3*e* to be rotated in the forward rotation direction for a predetermined time period, thus causing the projection media present on the apron belt 3*e* to be discharged (to fall) from small holes of the apron belt 3*e*.

Subsequently, as workpiece discharging processing (step S22), the controller 12 opens the lid 2*a* of the cabinet 2 and causes the apron belt 3*e* to be rotated in the reverse rotation direction in order to discharge the plurality of workpieces W to the carry-out conveyor 9. The carry-out conveyor 9 may start to convey the plurality of workpieces W, to which treatment has been applied, to an area in which a post process is performed.

Subsequently, as imaging processing (step S24), the control unit 141 of the control device 14 causes the camera 13 to image the projection chamber S.

Subsequently, as determination processing (step S26), the control unit 141 of the control device 14 determines that a residue is not present in the projection chamber S. Based on the initial image and an inspection image, the control unit 141 determines that a residue is not present. When it is determined that a residue is present (step S26: No), the control device 14 outputs, as stop processing (step S28), a signal for stopping the subsequent blasting processing applied to the controller 12. With such an operation, the subsequent blasting processing is stopped. When it is determined that a residue is not present (step S26: Yes) and when the stop processing (step S28) ends, the flowchart shown in FIG. 2 ends.

The controller 12 uses a series of processing shown in FIG. 2 as one batch, and repeatedly operates the batch. In performing a next batch, the operator or the like may supply, to the cabinet 2, projection media by an amount corresponding to the loss caused in the blasting treatment (deficit).

Summary of Embodiment

In the workpiece processing apparatus 1, the image of the projection chamber S is picked up to form an image. Based on the initial image, which is an image of the projection chamber S with no workpieces remaining, and the inspection image, which is an image of the projection chamber S after the discharging processing, information relating to the presence or absence of a residue in the projection chamber S is outputted. As described above, the workpiece processing apparatus 1 can output information relating to the presence or absence of a residue in the projection chamber S based on the image of the projection chamber S and hence, the workpiece processing apparatus 1 can confirm the discharge of workpieces to which treatment has been applied. In the conventional workpiece processing apparatus, when blasting is applied to the plurality of workpieces W, there is a concern that some of the plurality of workpieces W may remain in the projection chamber S after discharging processing. For example, a workpiece having a cylindrical shape or a spherical shape easily rolls. In a workpiece processing apparatus of an apron type, in discharging workpieces that have a shape allowing easy rolling after blasting treatment is applied, even when an attempt is made to discharge the workpieces by rotating an apron belt in the reverse rotation direction, there may be cases where some workpieces roll on the apron, thus not being discharged from the apron. In the case where a next batch is performed with a residue being present, not only that the number of products may differ from the planned number of products, but also that there may be a concern of occurrence of a variation in quality of products since blasting is excessively applied to the residue. In the case where processing is performed a plurality of times continuously for products in the same specification, it is difficult to judge, in a later stage, that workpieces to which treatment has been applied are mixed. In contrast, in the workpiece processing apparatus 1, based on the initial image and the inspection image, it is possible to confirm that workpieces are not remaining in the projection chamber S. Therefore, the workpiece processing apparatus 1 can avoid lowering the quality of products.

The exemplary embodiment has been described heretofore. However, the present invention is not limited to the above-described exemplary embodiment, and various omissions, substitutions, and changes may be made.

The workpiece processing apparatus 1 is not limited to a so-called apron type blasting machine, and may be a drum type blasting machine. The workpiece processing apparatus 1 may be an apparatus that applies peening treatment to the plurality of workpieces W.

The camera 13 is not limited to one camera. That is, the workpiece processing apparatus 1 may include a plurality of image sensors. The workpiece processing apparatus 1 outputs information relating to the presence or absence of a residue in the projection chamber based on the results from the plurality of image sensors. Accordingly, compared with the case where a single image sensor is used, the workpiece processing apparatus 1 can improve accuracy of information relating to the presence or absence of a residue in the projection chamber S.

In the case of the first operation of the workpiece processing apparatus 1 of the day, immediately before the workpiece preparation processing (step S10) shown in FIG. 2, the workpiece processing apparatus 1 may form an inspection image with the camera 13 to determine the presence or absence of a residue in the projection chamber S. With such an operation, before workpieces are charged for the first time of the day, the workpiece processing apparatus 1 can confirm that a residue is not present in the projection chamber S.

To strengthen a traceability function, the workpiece processing apparatus 1 may photograph the projection chamber S immediately after the workpiece charging processing (step S14) shown in FIG. 2. With such an operation, the state of the plurality of workpieces W immediately before treatment is applied can be confirmed after the fact. Alternatively, to strengthen a traceability function, the workpiece processing apparatus 1 may photograph the projection chamber S immediately before the workpiece discharging processing (step S22) shown in FIG. 2. With such an operation, the state of the plurality of workpieces W immediately after treatment is applied can be confirmed after the fact.

REFERENCE SIGNS LIST

1: workpiece processing apparatus, 2: cabinet, 3: apron, 4: projector, 13: camera (one example of image sensor), 14: control device, 141: control unit, 142: storage device, S: projection chamber.

What is claimed is:

1. A workpiece processing apparatus comprising:

a cabinet having a projection chamber, a plurality of workpieces being subjected to processing in the projection chamber;

a projector configured to project projection media toward the plurality of workpieces charged into the projection chamber;

an image sensor configured to image the projection chamber to form an image; and a control unit configured to output information relating to presence or absence of a residue in the projection chamber based on an initial image and an inspection image, the initial image being an image formed by the image sensor and being an image of the projection chamber with no workpiece remaining, the inspection image being an image formed by the image sensor and being an image of the projection chamber after discharging processing in which the plurality of workpieces are discharged from the projection chamber, wherein the control unit stores at least either one of operation information of the workpiece processing apparatus in a storage device in association with the inspection image or processing information of the plurality of workpieces in the storage device in association with the inspection image.

2. The workpiece processing apparatus according to claim 1, wherein the initial image is an image obtained such that an image of the projection chamber is imaged by the image sensor at a time of starting up the workpiece processing apparatus for a first time or at a time of maintenance.

3. The workpiece processing apparatus according to claim 1, wherein the control unit compares the initial image and the inspection image and outputs the information relating to the presence or absence of a residue in the projection chamber.

4. The workpiece processing apparatus according to claim 2, wherein the control unit compares the initial image and the inspection image and outputs the information relating to the presence or absence of a residue in the projection chamber.

5. The workpiece processing apparatus according to claim 1, wherein the control unit outputs the information relating to the presence or absence of a residue in the projection chamber based on difference information between the initial image and the inspection image.

6. The workpiece processing apparatus according to claim 2, wherein the control unit outputs the information relating to the presence or absence of a residue in the projection chamber based on difference information between the initial image and the inspection image.

7. The workpiece processing apparatus according to claim 3, wherein the control unit outputs the information relating to the presence or absence of a residue in the projection chamber based on difference information between the initial image and the inspection image.

8. The workpiece processing apparatus according to claim 4, wherein the control unit outputs the information relating to the presence or absence of a residue in the projection chamber based on difference information between the initial image and the inspection image.

9. A method for processing a workpiece, comprising:

a step of forming an initial image by imaging an image of a projection chamber with no workpiece remaining;

a step of projecting projection media toward a plurality of workpieces in the projection chamber;

a step of discharging, from the projection chamber, the plurality of workpieces to which the projection media are projected;

a step of forming an inspection image by imaging an image of the projection chamber after the step of discharging the plurality of workpieces;

a step of outputting information relating to presence or absence of a residue in the projection chamber based on the initial image and the inspection image, and a step of storing at least either one of operation information of the workpiece processing apparatus in a storage device in association with the inspection image or processing information of the plurality of workpieces in the storage device in association with the inspection image.

10. The workpiece processing apparatus according to claim 1, wherein the control unit is configured to output a signal for stopping subsequent blasting processing to a controller of the projector when it is determined that a residue is present.

11. The workpiece processing apparatus according to claim 1, further comprising a stirring belt configured to stir the plurality of workpieces in the projection chamber by rotating, wherein the control unit is configured to:

correct the inspection image according to a rotational position of the stirring belt, and output the information relating to presence or absence of the residue in the projection chamber based on the initial image and the corrected inspection image.

* * * * *